United States Patent
Loomer

[19]

[11] Patent Number: 5,864,998
[45] Date of Patent: *Feb. 2, 1999

[54] MODULAR STRUCTURAL MEMBERS

[75] Inventor: Weston R. Loomer, 12352 Gaines Way, Walton, Ky. 41094

[73] Assignee: Weston R. Loomer, Walton, Ky.

[*] Notice: The terminal 28 months of this patent has been disclaimed.

[21] Appl. No.: 938,487

[22] Filed: Aug. 31, 1992

Related U.S. Application Data

[63] Continuation of Ser. No. 456,569, Dec. 26, 1989, abandoned.

[51] Int. Cl.$^6$ ............................................. E04B 5/00
[52] U.S. Cl. ........................... 52/271; 52/738; 52/732.2; 52/731.3
[58] Field of Search ............................... 52/731, 738, 239, 52/263, 271, 297, 221, 730, 220, 283, 295, 737, 594

[56] References Cited

U.S. PATENT DOCUMENTS

| | | |
|---|---|---|
| 892,333 | 6/1908 | Traub . |
| 1,037,099 | 8/1912 | York . |
| 1,689,678 | 10/1928 | Mauterer . |
| 1,959,756 | 5/1934 | Ferm ......................................... 189/25 |
| 1,974,427 | 9/1934 | Knight ......................................... 72/6 |
| 2,473,728 | 6/1949 | Rutledge ................................... 189/36 |
| 2,912,075 | 11/1959 | Pfistershammer ......................... 189/26 |
| 3,312,034 | 4/1967 | Steinmann ................................. 52/731 |
| 3,363,386 | 1/1968 | Elflein ....................................... 52/586 |
| 3,374,593 | 3/1968 | Rensch .................................. 52/731 X |
| 3,420,505 | 1/1969 | Jeffreys ............................... 52/731 X |
| 3,593,477 | 7/1971 | Briggs ................................... 52/723 X |
| 3,728,837 | 4/1973 | Kiefer, Jr. ............................. 52/738 X |
| 3,815,311 | 6/1974 | Nisula ...................................... 52/579 |
| 3,829,226 | 8/1974 | Kreusel ................................... 403/295 |
| 3,858,377 | 1/1975 | Browne et al. .......................... 52/495 |
| 3,918,223 | 11/1975 | Carlsson .................................. 52/221 |
| 3,974,372 | 8/1976 | Cochran ............................. 52/731 X |
| 4,038,802 | 8/1977 | Bajorek .................................... 52/731 |
| 4,128,983 | 12/1978 | Matsubara ................................ 52/731 |
| 4,211,179 | 7/1980 | Saunders .................................. 114/90 |
| 4,497,260 | 2/1985 | Bucher ................................... 108/56.1 |
| 4,550,539 | 11/1985 | Foster .................................. 52/731 X |
| 4,556,337 | 12/1985 | Marshall ................................. 403/255 |
| 4,630,417 | 12/1986 | Collier ...................................... 52/263 |
| 4,905,442 | 3/1990 | Daniels ............................... 52/731 X |

FOREIGN PATENT DOCUMENTS

| | | | |
|---|---|---|---|
| 2423264 | 12/1975 | Germany ................................. 52/263 |
| 2931162 | 2/1981 | Germany ................................. 52/731 |
| 629078 | 9/1949 | United Kingdom ..................... 52/731 |

OTHER PUBLICATIONS

Reynolds Aluminum, "Reynolds Aluminum Colonial Columns", Jan. 1973.

*Primary Examiner*—Lanna Mai
*Attorney, Agent, or Firm*—Hoffman, Wasson & Gitler

[57] ABSTRACT

A plurality of extruded aluminum structural modules of selected different peripheral sizes are configured to be disposed in adjacent coacting positions so that a selected number of such modules assembled together form a peripherally enclosed modular structural member. Each module includes components of module positioning elements in the form of splines sizes and configured to coact with mating module positioning elements of the other structural modules to facilitate assembly of modules into a structural member. Force applying devices, such as HELICOILS are disposed to urge the module positioning elements together to insure the integrity of the assembled modular structural member. Each structural module further is configured with openings that may be threaded so that plates and the like may be attached to the member by threaded devices and elongated slots, such as "T" slots that receive and mount members, such as "T" bolts or nuts, through which other elements, components and devices may be carried by and mounted to the structural members. The structural members may be extended in length by staggered connection of modules or module sets and may be secured together by bolts or the like to form various constructions.

15 Claims, 6 Drawing Sheets

MODULAR STRUCTURAL MEMBERS

This is a continuation of application Ser. No. 07/456,569 filed on Dec. 26, 1989, now abandoned.

BACKGROUND OF THE INVENTION—FIELD OF THE APPLICATION

This invention relates to structural members and more particularly to modular structural members.

BACKGROUND OF THE INVENTION—DESCRIPTION OF THE PRIOR ART

Structural members include posts, rails, beams and similar mechanical items and constructions which may be disposed in vertical, horizontal or other dispositions, alone or in combination with other such structural members. Such members may function as supports in numerous applications, including supporting devices which attach to, or hang or project from the structural member, or for supporting mechanisms which are carried by and move along and with respect to the structural member. Quite often such structural members are in a hollow tube-like configuration to provide an advantageous strength to weight ratio with the cross-section of the hollow and the tube usually being circular, rectangular, square, triangular or any other convenient configuration.

One readily available tubular structural member is a section of conventional cast or rolled and welded pipe (of suitable diameter). However, attaching devices, members and mechanisms to pipe structural members creates unwanted problems and may require machining of significant lengths of such pipe in relatively expensive equipment in particular circumstances.

At times, it has proven advantageous, for whatever reason, to form hollow tubular structural members from modules which are assembled together to provide the hollow tube like cross-section. A circular pipe-like tube may be formed as shown in U.S. Pat. No. 1,037,099 issued on Aug. 27, 1912 to J. E. York for *Process of Making Shapes For Columns And The Like* wherein tubes are formed of semi-circular halves that appear to be bolted together. However, such structural members like cast and rolled and welded tubes are still relatively difficult to form so that other members and devices may be carried by or attached to the member and a bolted connection of the modular tube halves requires projecting and undesirable flanges which may unduly increase the weight of the member. Similarly the non-circular tube constructions shown in York require the same undesirable flanged and bolted construction.

Some available hollow tubular structural members are formed by welding a number of strips or plates of steel into a desired configuration, as shown in U.S. Pat. No. 1,959,756 issued on May 22, 1934 to J. F. Ferm for *Columnar Structure*. But, welding creates a structure that can not be readily taken apart and reassembled, requires the availability of welding equipment and skilled welders and possibly the necessity of special testing equipment to insure the integrity of the weld. In addition the welding action may set up unwanted stresses and strains in the resulting structure.

Some modular structural members may be assembled as shown in U.S. Pat. No. 1,689,678 issued on Oct. 30, 1928 to A. Mauterer for *Method of Making Piles*. But, the use of the described claws and ribs and the application of lateral forces to interlock same will not insure a tight, relatively non-slip interconnection and may be unworkable with structural members having relatively thick walls. U.S. Pat. No. 2,912,075 issued on Nov. 10, 1959 to J. Pfistershammer for Support *Structure Constructed From Hollow Members, More Particularly Tubes of Thin Hard-Rolled Metal Sheets*, shows a number of modular constructions for hollow tube-like structural members utilizing modules with a single or a pair of members rolled to form the tube. Such construction requires the formation of a special locking seam which once locked can not be unlocked without destroying the structural member and does not readily provide means to facilitate attaching of devices or structures to the member. Pfistershammer also shows the use of a multi-toothed clamping ring to facilitate connecting tubes of different diameter together, but, the use of an external clamping ring surrounding the structural member will most surely interfere with moving devices along the surface of the structural member which may prove undesirable.

Other modular structural constructions are shown: in U.S. Pat. No. 1,974,427 issued on Sep. 25, 1934 to H. M. Knight for *Wall;* in U.S. Pat. No. 2,473,728 issued on Jun. 21, 1949 to J. E. Rutledge for *Structural Joint;* and in U.S. Pat. No. 4,211,179 issued on Jul. 8, 1980 to L. G. Saunders for *Columnar Structure*. However such structures merely insert keys of varying configuration in similarly shaped openings or draw a rod through a circular opening to position modules of the construction in proximity to each other but do not otherwise insure the integrity of the juncture. Alternate modular type constructions for structures are shown and described in U.S. Pat. No. 3,728,837 issued on Apr. 24, 1973 to A. J. Kiefer, Jr. for *Modular Structures* and in U.S. Pat. No. 4,550,539 issued on Nov. 5, 1985 to T. L. Foster for Assemblage Formed Of A Mass of *Interlocking Structural Elements*. However, each of these constructions requires the lengthwise sliding together of the modular elements of the structure which may prove tedious and difficult where tight tolerances are required; and may result in twisting, sticking or galling of the module elements during the assemblage process. In addition no structure appears to be provided to insure and secure the continued relative disposition of the module member once assembled.

Some modular structural members, such as those shown and described in U.S. Pat. No. 3,312,034 issued on Apr. 4, 1967 to W. N. Steinmann for *Sign Support Post* position a pair of somewhat "U" shaped members face to face to form a hollow tube-like construction and then secure the members so positioned by clamps and tapered locking pins. Such a construction requires the use of flanges extending from the members to receive the clamps and locking pins, thus not only unduly adding to the relative weight and cost of the modular construction but also presenting obstacles to any device that may be carried by the structure for movement therealong. Other modular structural members, such as the one shown and described in U.S. Pat. No. 4,497,260 issued on Feb. 5, 1985 to A. Bucher for *Flat Pallet,* requires the use of wedges to maintain the pallet members in assembled position but does not effectively secure the wedges from being dislodged thus possibly permitting separation of the members and failure of the construction.

Some modular structural members, of the type shown and described in U.S. Pat. No. 3,815,311 issued on Jul. 11, 1974 to E. V. Nisula, et al for Interlocking, Serially Interconnection, Extruded Building *Block Modules For Walls, Floors, Ceilings, Etc.,* in U.S. Pat. No. 3,858,377 issued on Jan. 7, 1975 to W. B. Browne, et al for *Wall Panel Joint Structure,* in U.S. Pat. No. 4,128,983 issued on Dec. 12, 1978 to I. Matsubara for Panel Connector *Assembly,* and in U.S. Pat. No. 4,038,802 issued on Aug. 2, 1977 to J. E. Bajorek, et al for *Tubular Spindle Cover,* utilize serrated or toothed components to hold modular structural members together. Such constructions, however, fail to secure the resultant modular structure from separation and failure should forces be applied in directions tending to unsnap the toothed connections. Alternatively connectors of the type shown in U.S. Pat. No. 3,918,223 issued on Nov. 11, 1975 to S. A. Carlsson for *Sectional Stud For Modular Wall Section* which use "C" shaped flanges need to be slid in place. Such a connector may prove difficult to use if the members being connected thereby are relatively long if the channel receiving the flanges is relatively tight. If the channel is loose the connection wold not be tight and the resulting construction might fail under load or otherwise prove to be unacceptable.

Mechanisms and devices for securing members together are known but those taking the form of pins and keys, such as shown in U.S. Pat. No. 4,576,504 issued on Mar. 18, 1986 to T. A. Hartman for *Elastically Conformable Tapered Pin-Key* for assembling parts and shafts would be totally unacceptable and not considered for use in modular structural member constructions. Similarly fasteners of the type shown and described in U.S. Pat. No. 892,333 issued on Jun. 30, 1908 to C. J. Traub for *Joint Fastener,* in U.S. Pat. No. 3,829,226 issued on Aug. 13, 1974 to U. Kreusel for *Connector Assemblies For Hollow Members,* and in U.S. Pat. No. 4,556,337 issued on Dec. 3, 1985 to S. R. Marshall for *Connector For Framing System* appear to be suitable for furniture, door frames and picture frames, but would not ever be considered for use in securing the assembly of modular structural members because they would not suit that purpose. Alternatively a connector of the type shown and described in U.S. Pat. No. 3,363,386 issued on Jan. 16, 1968 to E. Eeflein et al for *Rivetless and Screwless Connection For Force Fit and Sliding Fit Of Adjacent Structural Elements* requires that a rod like coupling element be slid through a hollow space to couple separate elements together. But if the space is formed tight then insertion of the coupling rod may prove to be quite difficult and if the space does not tightly receive the coupling rod then the structural members may move with respect to each other in an unwanted and unacceptable manner.

SUMMARY OF THE INVENTION

It is therefore an object of the invention to provide a new and improved structural member.

It is another object of this invention to provide a new and improved modular structural member.

It is yet another object of this invention to provide a new and improved modular structural member in the form of a beam or post.

It is therefore another object of this invention to provide a new and improved modular structural member that is configured to readily carry devices, mechanisms and articles in either stationary positions or for movement with respect to the structural member.

It is yet still another object of this invention to provide a new improved modular structural members that may be readily attached to each other.

It is a further object of this invention to provide a new and improved modular structural member constructed from a plurality of modules which coact with each other to form a hollow tube-like structural member.

It is still a further object of this invention to provide new and improved modular structural members each constructed from a plurality of similar modules which coact with each other in selected combinations to form hollow tube-like structural members of different circumferential configurations.

It is yet a further object of this invention to provide a new and improved modular structural member constructed from a plurality of modules wherein each module includes coacting positioning members that facilitate disposition of the modules with respect to each other when forming the structural member.

It is yet still a further object of this invention to provide a new and improved modular structural member constructed from a plurality of modules each including positioning members which coact with similar positioning members on adjacently disposed modules to form a composite structural member and with securing means that urge the coacting positioning members into relatively tight coacting disposition to insure the integrity of the composite structural members.

It is yet still a further object of this invention to provide a new and improved modular structural member constructed from a plurality of extruded modules of selected lengths which coact together to form the structural member.

Other objects, features and advantages of this invention in its details of construction and arrangement of parts will be seen from the above, from the description of the preferred embodiments when considered with the drawing and from the appended claims.

DESCRIPTION OF THE PREFERRED EMBODIMENT

Figure 1:
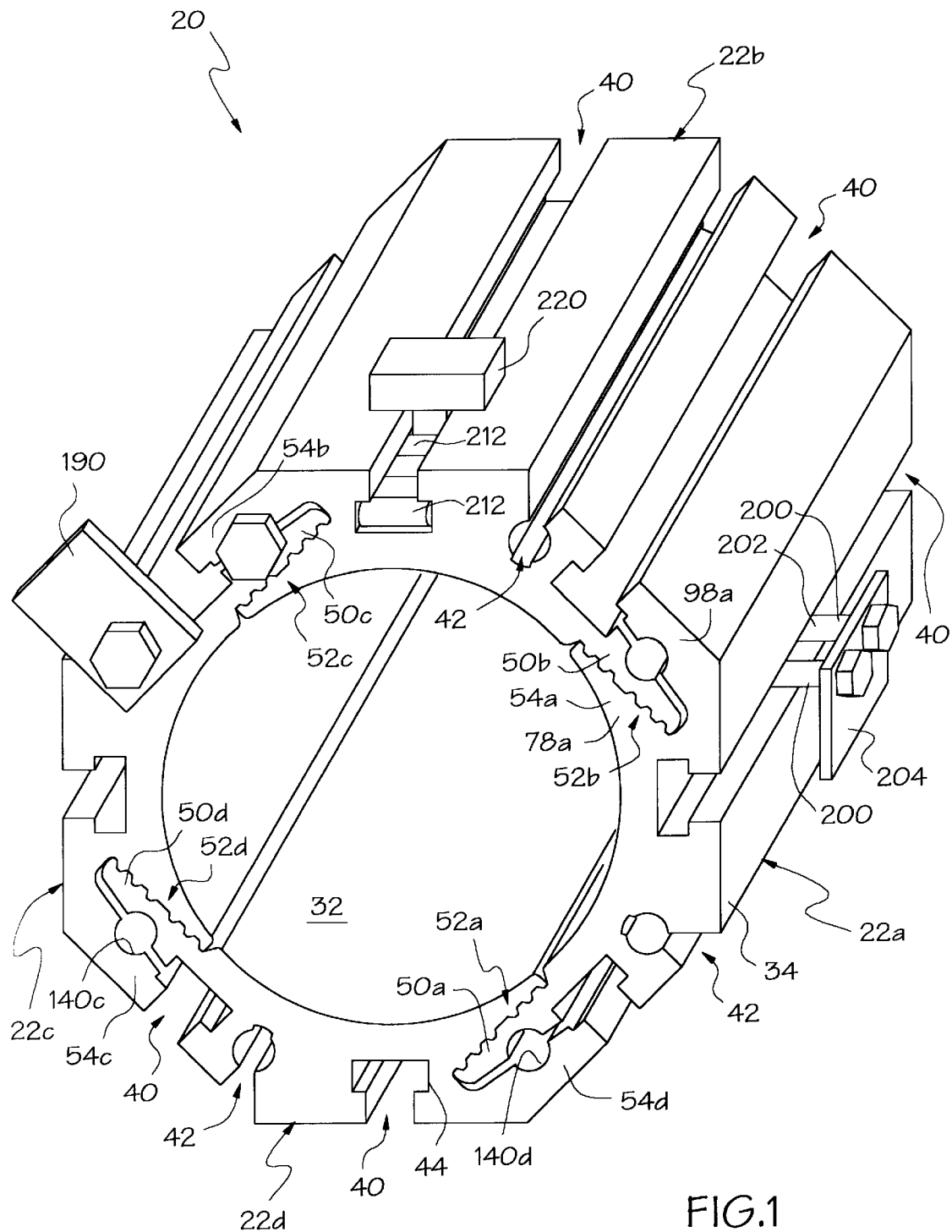
FIG. 1 is an isometric view of a modular structural member in the form of a beam incorporating the instant invention, with elements cut away to better show details thereof.

With reference to FIG. 1 there is generally shown at 20 a modular structural member, incorporating the instant invention, in the form of a beam adapted to be disposed in a generally horizontal position but which might just as readily be disposed in a vertical position or at some angular disposition. Beam 20 is constructed, or built up, from a plurality of identical structural modules 22a, 22b, 22c, and 22d; however, as it will be described later beams such as beam 20 may be constructed from different size but otherwise cooperating structural modules.

Each structural module 22 (FIGS. 1 and 2) is preferably formed from extruded aluminum, or other suitable and extrudable material. However, other forming process and materials which result in configurations of structural modules that cooperate as described for the instant invention are within the scope of this invention. All structural modules utilized for member 20 are identical so only module 22d of FIG. 1 will be described in detail. The body 30 of each module 22 includes all inner surface 32 and an outer surface 34 separated by a thickness of material suitable and appropriate for the purpose of modular structural member 20. In this particular instance body 30 is of a thickness to receive a "T" shaped slot 40 that extends the length of member 20 as well as a substantially circular opening 42 that also extends the length of member 20. The thickness of body 30 and the particular material from which body 30 is formed are also selected keeping in mind the end use and required strength characteristics for member 20.

The length of body 30 and of member 20 may be any selected, convenient, readily extrudable, length taking into consideration weight and use requirements. A five to ten foot long member 20 would be a convenient working size but such lengths are not critical to the instant invention and other selected lengths are contemplated.

"T" slot 40 and opening 42 are formed in body 30 to extend the entire selected length of module 22. The configuration of "T" slot 40, its size and disposition within body 30 and the configuration of opening 42 are selected depending upon the intended use for member 20. Other sizes, dispositions and configurations may be utilized. For example "T" slot 40 may just a easily be an "L" slot or the cross-bar portion 44 thereof may be round or have circular ends.

Each module 22 includes a male portion 50 of a positioning device 52 and a female portion 54 of positioning device 52. Four positioning devices 52 are shown in FIGS. 1-52a, 52b, 52c, and 52d. Thus for the member 20 shown in FIG. 1 female portion 54d of module 22d is disposed for coaction with male portion 52a of module 22a and male portion 52d of module 22d is disposed for coaction with female portion 54c of module 22c.

Each male portion 50 of each positioning device 52 includes a set of elongated splines 60 (FIG. 2) that extend the length of module 22 and further includes a single locating spline 62 that is relatively wider then splines 60. A top land 64 of splines 60, 62 is flat and a bottom land 66 between splines 60, 62 is also flat. The side walls 68 of spline 60, 62 are disposed at an angle with respect to the top and bottom lands as will be explained in great detail below. A substantially semi-circular groove 70 extends the entire length of male portion 50 on a surface thereof opposite to splines 60, 62 for purpose to be described below.

Each female portion 54 of each positioning device 52 includes a first jaw 78 carrying a set of elongated splines 80 that also extend the length of module 22. A top land 82 of each spline 80 is flat and a bottom land 84 between each land 80 is also flat. The side walls 86 of splines 80 are disposed at an angle with respect to the top and bottom lands. Splines 80, top lands 82 and bottom lands 84 are of a size and configuration to mesh with and seat between splines 60, 62 and top lands 64 and bottom lands 66 thereof. The angled side walls 86 of splines 80 cooperate with angled side walls 68 of splines 60, 62. A wide bottom land 90 is formed on each female portion 54 in position and of a size to cooperate with wide locating spline 62 and so that the cooperation thereof prevents mating of male portion 52 with female portion 54 unless wide bottom locating land 90 is aligned with wide locating spline 62. A substantially semi-circular groove 96 extends the entire length of a second jaw 98 of female portion 54 of positioning device 52 and in position to align with semi-circular groove 70 of male portion 50 when disposed of coaction with a female portion 54 of a positioning device 52.

Figure 2:
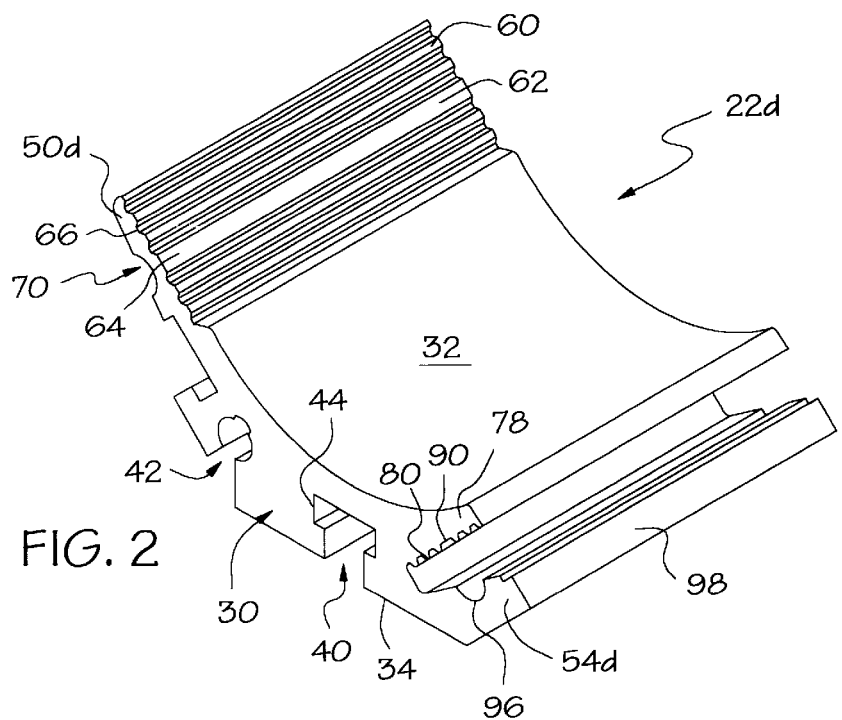
FIG. 2 is an isometric view of a single structural module of the beam of FIG. 1.
Figure 3:
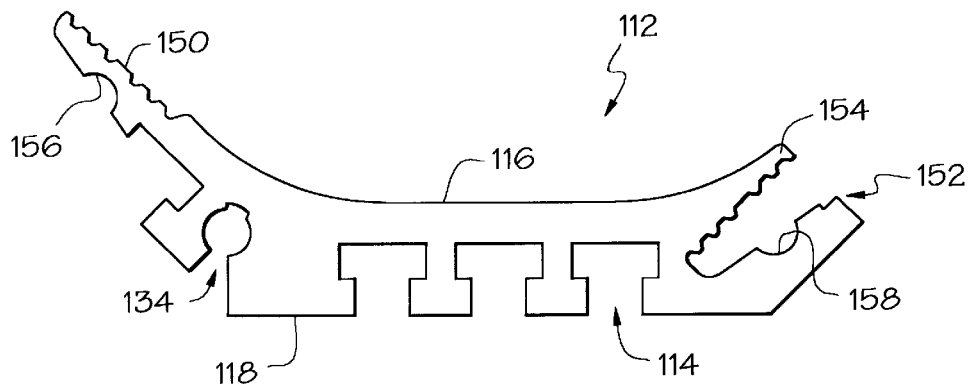
FIG. 3 is an end elevational view of an alternative embodiment of structural module similar to the module of FIG. 2.
Figure 4:
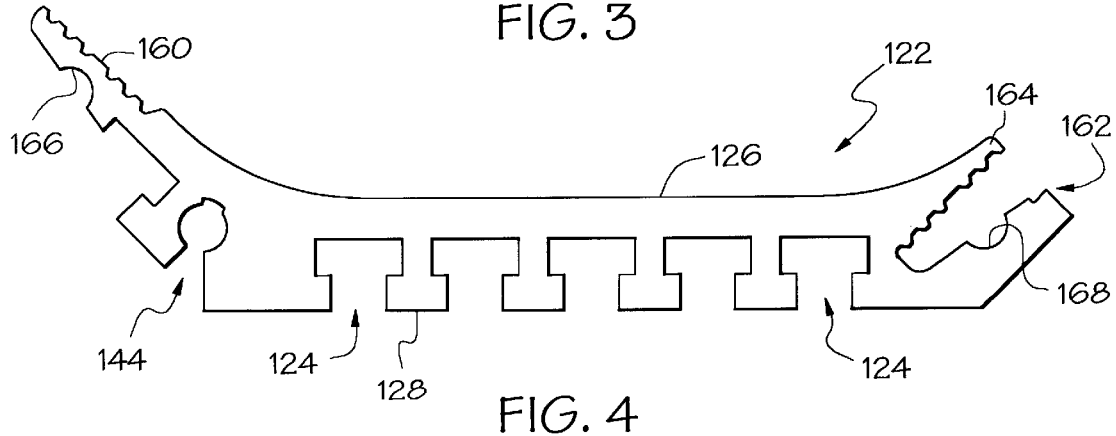
FIG. 4 is an end elevational view of another alternative embodiment of structural module similar to the module of FIGS. 2 and 3.

If desired structural module 22 may be formed of a different width or circumferential size as shown for a module 112 in FIG. 3 and a module 122 in FIG. 4. Each such module 112, 122 is formed of material and of a size, configuration and manner as module 22 (FIG. 2) except that module 112 (FIG. 3) includes three "T" slots 114 and module 122 (FIG. 4) includes five "T" slots 124. Accordingly an inner surface 116 (FIG. 3) of module 112 is relatively wider than inner surface 32 of module 22 and an inner surface 126 (FIG. 4) of module 122 is wider still. Similarly an outer surface 118 (FIG. 3) of module 112 is sized to be wide enough to accommodate the three "T" slots 114 while an outer surface 128 (FIG. 4) of module 122 is selected to be wide enough to accommodate the five "T" slots 124. Each module 112, 122 includes an opening 134, 144 respectively extending the length of the module and which is utilized for the same purposes as opening 42 of module 22 as hereinafter described. Each module 112, 122 also includes respectively, a male portion 150, 160 a female portion 154, 164, and substantially semi-circular grooves 156, 166, 158, 168, of positioning devices 152, 162 constructed, sized and configured identically to and as the same size as corresponding portions 50, 54 of positioning devices 52 of the embodiment of FIGS. 1 and 2. The configuration of modules 112, 122 their size, shape and respective positioning devices are such that the respective modules can cooperate with each other as well as identically sized modules to form differently configured modular structural members as will be explained herein below.

Figure 5A:
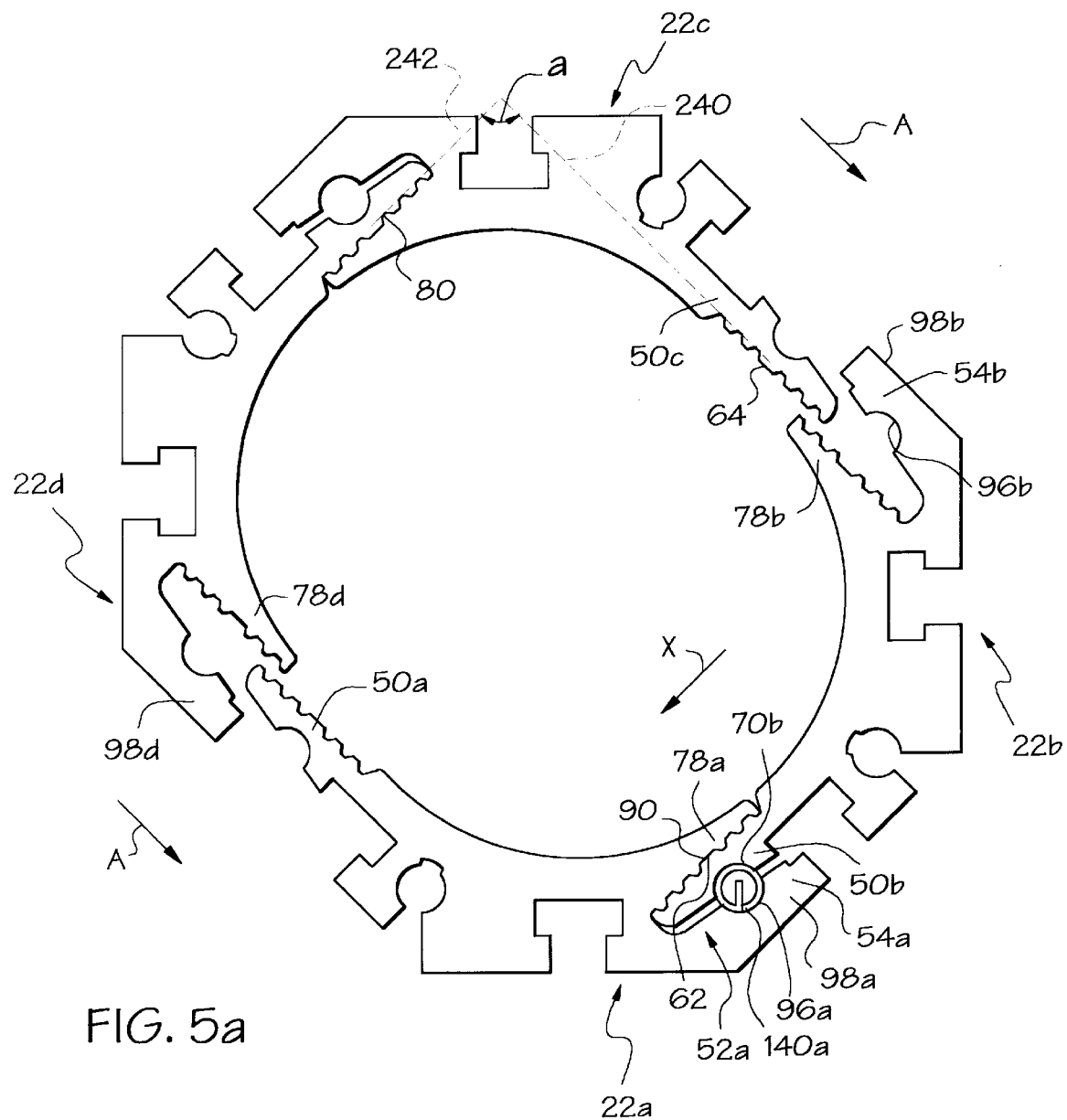
FIG. 5a is an end elevational view of the beam of FIG. 1, enlarged to better show details thereof, and showing two pairs of modules assembled to each other and in the process of being assembled together to form the beam of FIG. 1.
Figure 6:
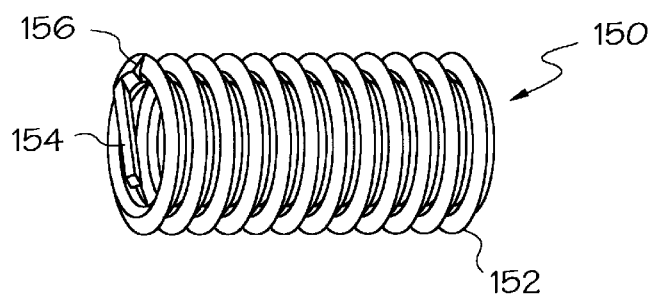
FIG. 6 is an enlarged isometric view of a conventionally available HELICOIL utilized in assembling the beam of FIG. 1.
Figure 5B:
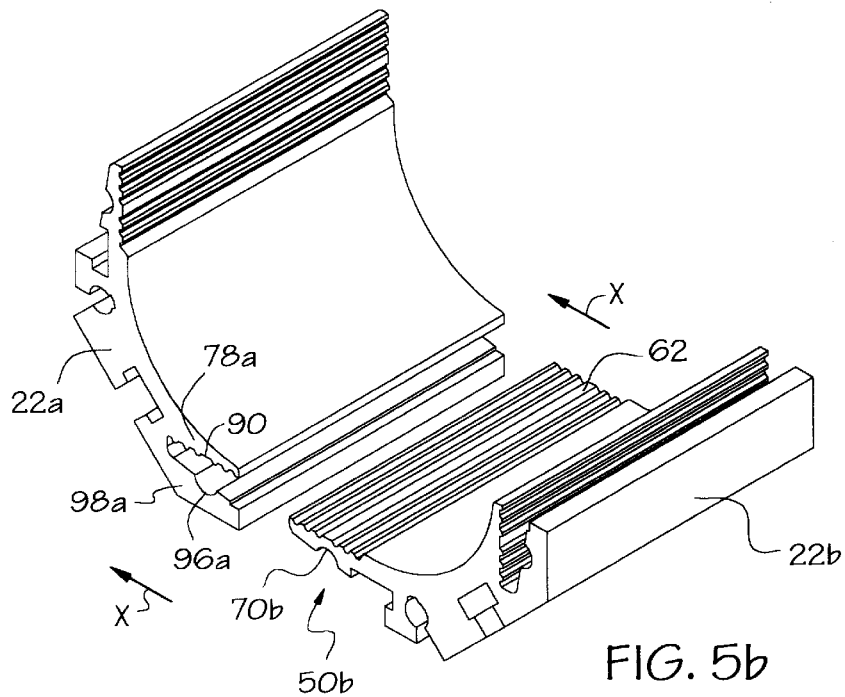
FIG. 5b is an isometric view of a pair of structural modules showing positioning thereof prior to being assembled into a module set.

To assemble structural member 20 module 22a (FIGS. 5a and 5b) and module 22b are disposed side to side adjacent each other and male portion 50b of module 22b is inserted in the direction of arrow "X" between jaws 78a, 98a of female portion 54a. Once wide locating spline 62 of male portion 50a is aligned with wide bottom locating land 90 of jaw 78 of female portion 54 the male and female portions may be moved into mating and abutting relationships as shown in FIGS. 1 and 5a to thus effectuate operation of positioning device 52a. To insure and secure the continued mating of male portion 50 with female portion 54 of positioning device 52 a force applying or biasing device 150 (FIGS. 5a and 6) is inserted in bore 140a formed by the aligned semi-circular grooves 70b, 96a. Force applying device 150 may, for example be a conventionally available HELICOIL insert which includes a wire body 152 (FIG. 6) wound into a spring configuration and a tang 154 at one end 156 thereof. By widening HELICOIL 150 to tighten spring body 152 thereof the outer diameter thereof may be reduced to a size that permits insertion into bore 140a. The winding of HELICOIL 150 in this manner may be facilitated by a tool provided by the HELICOIL manufacturer. Once force applying device 150 is inserted in bore 140a, it can be moved to the far end of bore 140a by a suitably sized bar or rod. Additional HELICOILS 150 may then be similarly inserted into bore 140a at selected spacing until the entire length of bore 140 is retained. If desired a special securing fitting may be applied to the respective ends of bore 140a by first tapping at (170 (FIG. 7)) the respective ends of bore 140a to receive at each such end a HELICOIL 172 which may be selected to be slightly larger than HELICOILS 150. After HELICOILS 172 are threaded into the respective ends of bore 140a a suitably sized threaded fastener, such as a bolt 174, is threaded into HELICOILS 172.

Figure 8:
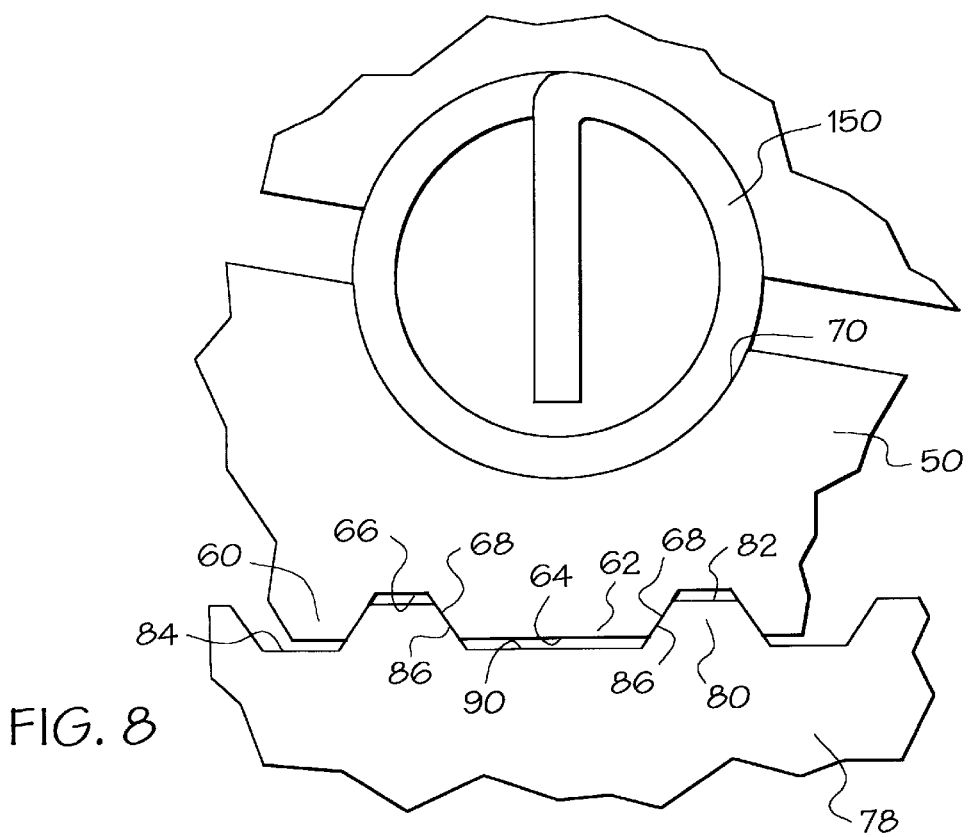
FIG. 8 is an enlarged schematic showing the coaction between the HELICOIL and the positioning members for the beam of FIG. 1.

When HELICOILS 150 are disposed within bore 140a their natural operation is to unwind until they are exerting force upon the walls of groove 140a. This, in turn, firmly and securely seats splines 60, 62 with splines 80. When splines 60, 62 are so mated with splines 80 the angles and coacting side walls 66, 86 thereof coact as shown in FIG. 8. The depth of splines 60, 62, and 80 and the angles of side walls 66, 86, thereof have been selected so that top lands 64, 82 do not seat against bottom lands 66, 84 thus the forces applied by HELICOILS 150 maintain engagement of side walls 66, 86 and mating of each positioning device 52.

Any resilient coil device may be substituted for HELICOIL 150 as the force applying device 150. The wire cross-section of the spring for such coil device may take any convenient configuration including round, square, oval or the like.

A second pair of structural modules 22c, 22d (FIG. 5a) may be assembled in the manner described for the assembly of modules 22a and 22b. Thereafter the module set 22a–22b and the module set 22c–22d are assembled together by inserting male portion 50c between jaws 78b, 98b of female portion 54b of positioning device 50b by moving set 22c–22d in the direction of arrow A. At the same time male portion 50a is inserted between jaws 78d, 98d of female portion 54d of module 22d. When module set 22a–22b is moved into full position with respect to module set 22c–22d the respective splines 60, 62, and 80 are moved into mating relationship as described above for the assembly of module set 22a–22d. HELICOIL force applying device are thereafter inserted as described above for module set 22a–22b and securing bolts 174 may be applied as described above for module set 22a–2b. The assembled modules 22a, 22b, 22c, and 22d will thus form modular structural member 20 (FIG. 1).

A conventionally available bonding agent may also be applied to the side surfaces 68, 86 of splines 60, 62, and 80 to further secure positioning device 52 in its firmly mated position and add additional strength against longitudinal movement of one module with respect to its adjacent coacting module or modules.

Figure 7:
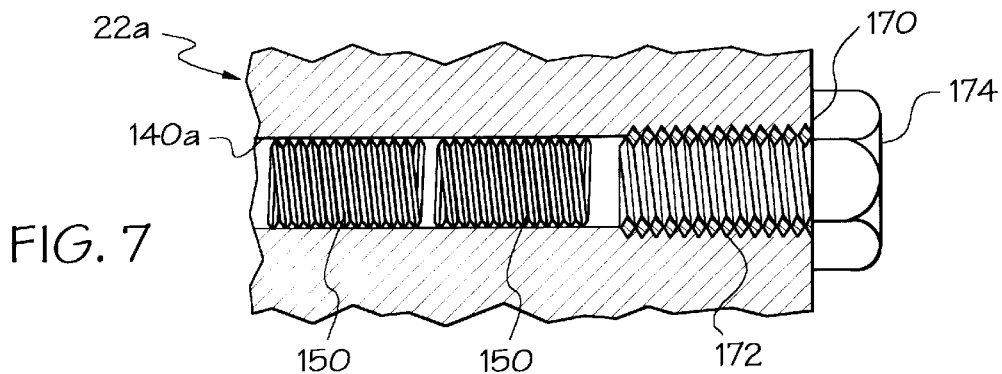
FIG. 7 is an enlarged section of a small portion of the beam of FIG. 1 showing a preferred way of securing the HELICOILS in position.

If desired a plate 190 may be attached to an end of member 20 by tapping an opening 42 or a bore 140, threading a suitably size HELICOIL into the opening 42 or bore 140 as described with reference to FIG. 7 and threading a threaded fastener such as a bolt through plate 190 and into the HELICOIL so positioned in opening 42 or bore 140. A number of similar threaded fasteners inserted into HELICOILS in other openings 42 or bores 140 may be utilized to secure plate 190 if required or to secure other articles or devices to an end of member 20. Openings 134, 144 of modules 112, 122 and bores formed by grooves 156, 158, 166, 168 maybe similar used.

"T" slots 40 are sized to receive conventionally available "T" bolts 200 (FIG. 1) which may be mounted to slide within "T" slot 40 and/or to be fixedly positioned by suitable and conventional means 202 therealong. Devices, such as rollers, pendants, or the like may then be mounted to "T" bolts 200 as at 204. Alternatively other devices such as device 220 may be carried by rollers 212 also disposed within "T" slot 40. A "T" nut may be used in place of or in addition to a "T" bolt.

Each module 22, 112, 122 is configured to described a module angle "a" (FIG. 5a). For modules 22, 112, and 122 angle "a" is the angle included between intersecting lines 240, 242 drawn across top lands 64 of splines 60, 62 and top lands 82 of splines 80 respectively. Angle "a" for modules 22, 112, and 122 is ninty degrees and as such four such modules must be combined to form a completely enclosed member 20. By configuring the structural modules to describe a different angle "a" such as one-hundred and eighty degrees, sixty-degrees, thirty degrees, or for that matter any selected number of degrees one can determine how many modules will be needed to form a completely enclosed structural member. For example only two modules would be required if angle "a" is one-hundred eighty degrees, while six modules would be required is angle "a" is sixty degrees and eight modules would be required if angle "a" is fourty-five degrees.

A structural member which is not a fully enclosed hollow tube may also be formed from modules 22, 112, 122 and the like by utilizing a smaller number of modules then required to form a fully enclosed tubular member.

Figure 9:
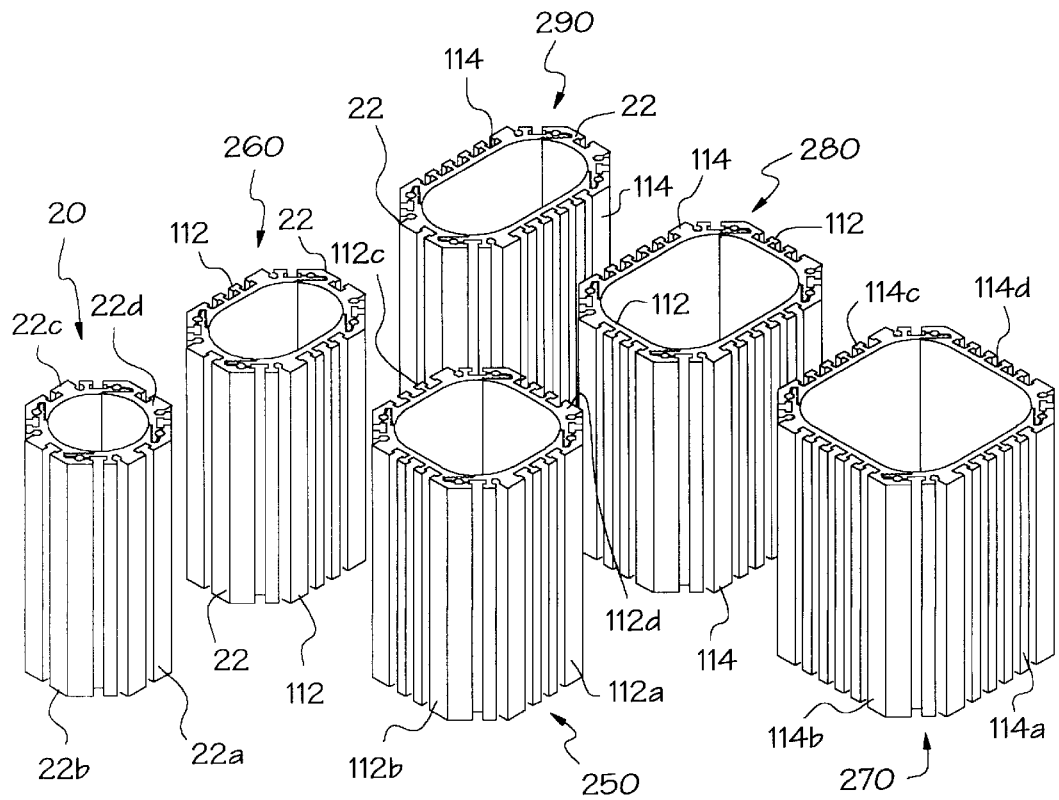
FIG. 9 is a schematic showing a number of different modular structural embers constructed from the structural modules of FIGS. 2, 3 and 4.

A modular structural member 250 (FIG. 9) may be assembled from four structural modules 112 (FIG. 3) by assembling such modules 112a, 112b, 112c and 112d (FIG. 9) in the manner described above for assembling member 20 from modules 22a, 22b, 22c and 22d. Alternatively, a modular structural member 260 may be assembled from a pair of modules 112 (FIGS. 3 and 9) and a pair of modules 22 (FIGS. 2 and 9). In doing so, it should be remembered that while the peripheral size of module 112 is relatively larger than the peripheral size of module 22 that the positioning devices 52, 152 of all such modules are sized to coact with each other.

In similar manner a structural member 270 (FIG. 9) may be assembled from four structural modules 114 (FIGS. 4 and 9) by assembling such modules 114a, 114b, 114c, 114d in the manner described above for assembling member 20 from modules 22a, 22b, 22c and 22d. In like manner a structural member 280 may be assembled from a pair of modules 114 and a pair of modules 112, and a member 290 may be assembled from a pair of modules 114 and a pair of modules 22.

The peripheral size of member 20 is selected to fit within and be movable with respect to member 250 and, if desired, members 270, 280; and the peripheral size of member 250 is selected to fit within and be movable with respect to member 270. In like manner the peripheral size of member 260 is selected to fit within and be movable with respect to members 270 and 280. The construction and sizing of one modular structural member to fit within and be movable with respect to another modular structural member facilitates the use of structural members incorporating the instant invention, in robotic and other constructions.

Figure 10:
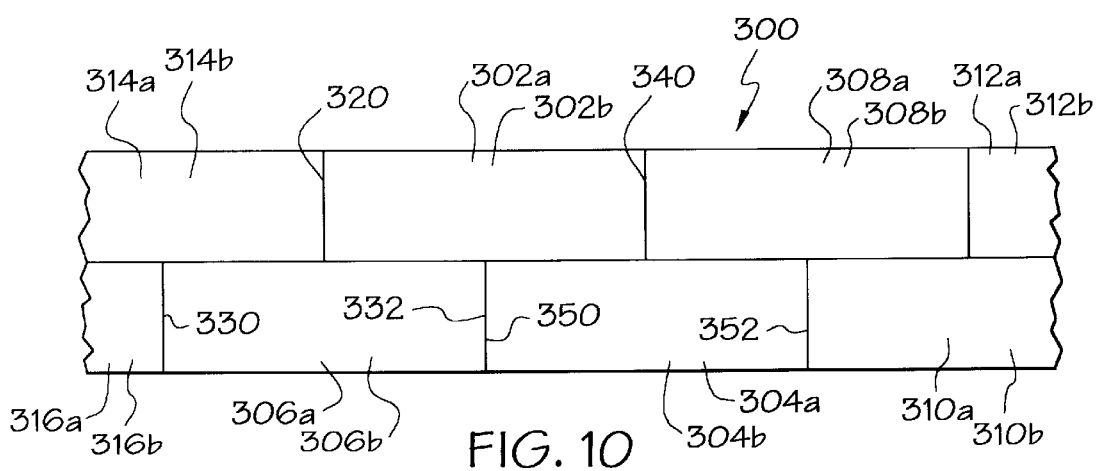
FIG. 10 is a schematic showing of a section of a modular structural member of relatively elongated length.

A modular structural member having an end to end length greater than the end to end length of a member such as member 20 (FIG. 1) may be accomplished as shown in FIG. 10 for a modular structural member 300. Assembled modular sets 302a, 302b are assembled to modular sets 304a, 304b and 306a–306b in the manner described above for assembling modular set 22a–22b to modular set 22c–22d. However, in doing so a first end 320 of modular set 302a–302b is disposed to be substantially centered between respective ends 330, 332 of modular set 306a–306b and a second end 340 of modular set 302a–302b is disposed to be substantially centered between respective ends 350, 352 of modular set 304a–304b. The peripheral size and configuration of the modular sets utilized for a member such as member 300 are selected to match as shown, for example, in FIG. 9. The positioning devices of the modular sets are all compatible and sized to coact with each other and thus facilitate the construction of members such as member 300. The length of modular sets at the respective ends of member 300 will have to be sized to provide an appropriate flush end if desired.

Modular sets 22a–22b and 22c–22d need not be centered end to end with respect to each other, as shown, but may be disposed at any position, end to end, with respect to an adjacent modular set. In fact the modules of each set may be staggered with respect to each other and proceed along the resulting structural member in adjacent spiral like fashion.

Figure 11:
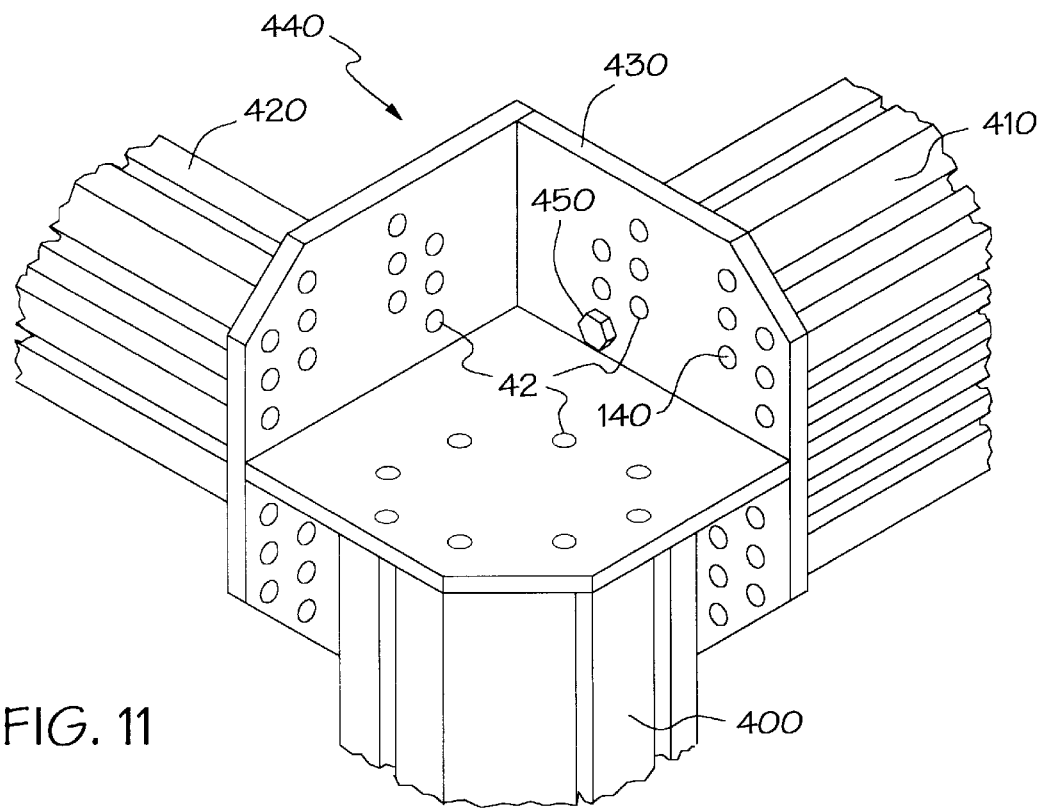
FIG. 11 is a schematic showing interconnection of three modular structural members incorporating the instant invention.

Modular structural members such as members 200, 250, 260, 270, 280 and 290 may be utilized in many and varied manners and for relatively unlimited purposes. They may, for example, be connected to form a juncture or joint as shown, for example in FIG. 11. Three modular structural members 400, 410, and 420 are shown connected end to end by a plate arrangement 430 to form a juncture or joint 440. Plate 430 is formed with a plurality of holes sized and positioned to align with openings such as 42 and 140 (FIG. 1), 134 (FIG. 3) or 144 (FIG. 4). The disposition of HELI-COILS in such openings (42, 140, 134, 144) as previously described will permit the use of threaded fasteners, such as bolts 450 (FIG. 11) to be utilized to secure plate 430 to members 400, 410 and 420 as shown in FIG. 11. If desired, openings 42, 134, 144 may be tapped and bolts 450 threaded directly thereto.

Figure 12:
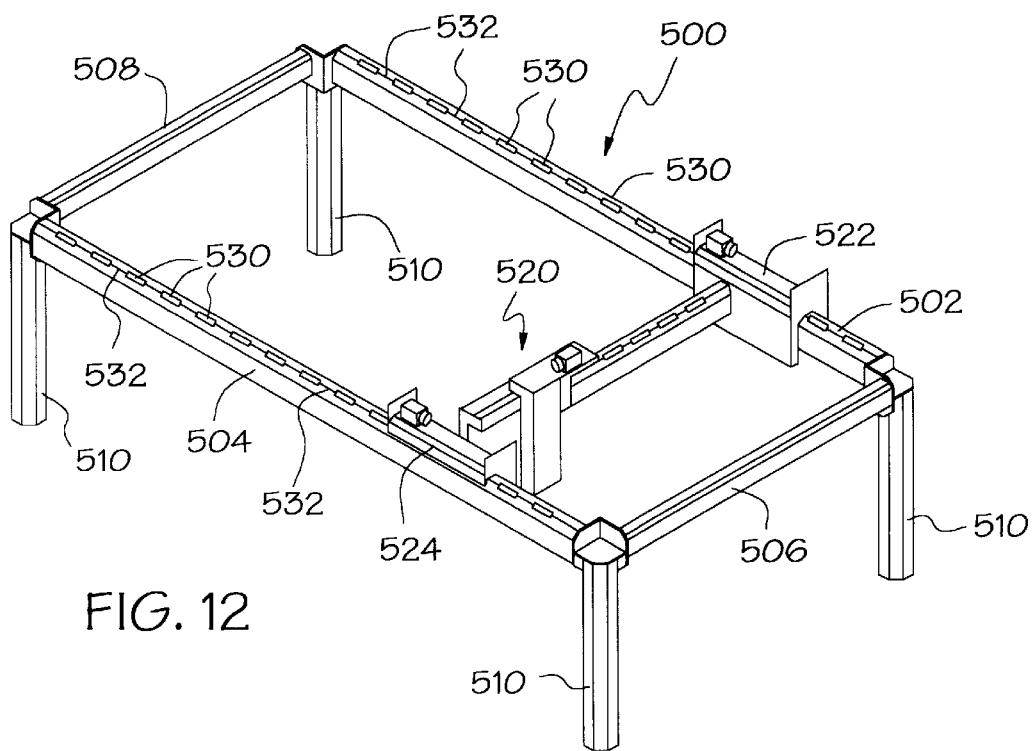
FIG. 12 is a schematic of a bridge crane type of construction utilizing modular structural members incorporating the instant invention.

Another configuration of a construction 500, formed from modular structural members such as members 20, 250, 260, 270, 280 and 290 is shown in FIG. 12. In construction 500 a pair of modular structural members 502, 504 incorporating the instant invention, span construction 500. Members 502, 504 are disposed in a parallel position spaced from each other by a pair of members 506, 508 which may be similar modular structural members or, depending upon specific uses therefore, other support type members. Four vertically disposed posts 510 position members 502–508 as a desired height. Posts 510 may also either be modular structural members constructed according to the description herein or they may be other types of posts depending upon the intended application.

Spanning construction 500 is a bridge type device 520, such as a bridge crane, having ends 522, 524 which are disposed for selectively controlled rolling movement upon members 502, 504. Rollers 530, either powered or merely relatively mounted are secured in "T" slots 532 disposed along the tops of members 502, 504 as described above for disposed devices in the "T" slots of member 20.

From the above description it will thus be seen that there has been shown and described a novel and improved construction for modular structural members, which members may be constructed and assembled in various selected peripheral configurations and in various selected lengths from a selected number of structural modules sized and configured to coact with each other.

It is understood that although I have shown the preferred embodiments of my invention that various modifications may be made in the details thereof without departing from the spirit as comprehended by the following claims.

What is claimed is:

1. A modular structural member capable of supporting a load or loads; comprising:
   (a) a plurality of structural module means each of a selected length and peripheral configuration such that a predetermined number of said structural modular means together, when disposed in adjacent side-by-side and coacting disposition, form a peripherally enclosed hollow tubular structural member;
   (b) module positioning means disposed between adjacent and coacting structural module means to facilitate said side-by-side coacting disposition thereof; and
   (c) force applying means disposed for coaction with said module positioning member to maintain adjacent modules positioned for coaction with respect to each other and by doing so to maintain the integrity of the structural member and its capability to support a load or loads at least a portion of which acts on the structural member in a direction perpendicular to said selected length thereof,
   wherein said module positioning means includes a first positioning member carried by a first structural modular means and a second positioning member carried by second structural modular means, said first positioning member and said second positioning member coacting with each other when said first structural modular means and said second structural modular means are disposed in adjacent coacting positions,
   wherein said first positioning member and said second positioning member each include at least a pair of positioning splines, said pair of positioning splines of said first positioning member and said pair of positioning splines of said second positioning member being of sizes, dispositions and configurations to coact with and mate with each other.

2. A modular structural member capable of supporting a load or loads; comprising:
   (a) a plurality of structural module means each of a selected length and peripheral configuration such that a predetermined number of said structural modular means together, when disposed in adjacent side-by-side and coacting disposition, form a peripherally enclosed hollow tubular structural member;
   (b) module positioning means disposed between adjacent and coacting structural module means to facilitate said side-by-side coacting disposition thereof; and
   (c) force applying means disposed for coaction with said module positioning member to maintain adjacent modules positioned for coaction with respect to each other and by doing so to maintain the integrity of the structural member and its capability to support a load or loads at least a portion of which acts on the structural member in a direction perpendicular to said selected length thereof,
   wherein said module positioning means includes a first positioning member carried by a first structural modular means and a second positioning member carried by second structural modular means, said first positioning member and said second positioning member coacting with each other when said first structural modular means and said second structural modular means are disposed in adjacent coacting positions, wherein said first positioning member and said second positioning member each include at least a pair of positioning splines, said pair of positioning splines of said first positioning member and said pair of positioning splines of said second positioning member being of sizes, dispositions and configurations to coact with and mate with each other, wherein said pair of positioning splines are sized and configured to coact in only one mating position.

3. A modular structural member capable of supporting a load or loads; comprising:

(a) a plurality of structural module means each of a selected length and peripheral configuration such that a predetermined number of said structural modular means together, when disposed in adjacent side-by-side and coacting disposition, form a peripherally enclosed hollow tubular structural member;

(b) module positioning means disposed between adjacent and coacting structural module means to facilitate said side-by-side coacting disposition thereof; and (c) force applying means disposed for coaction with said module positioning member to maintain adjacent modules positioned for coaction with respect to each other and by doing so to maintain the integrity of the structural member and its capability to support a load or loads at least a portion of which acts on the structural member in a direction perpendicular to said selected length thereof, wherein said module positioning means includes a first positioning member carried by a first structural modular means and a second positioning member carried by second structural modular means, said first positioning member and said second positioning member coacting with each other when said first structural modular means and said second structural modular means are disposed in adjacent coacting positions, wherein said first positioning member and said second positioning member each include at least a pair of positioning splines, said pair of positioning splines of said first positioning member and said pair of positioning splines of said second positioning member being of sizes, dispositions and configurations to coact with and mate with each other, wherein said pairs of positioning splines are sized and configured to coacting only one mating position, wherein said pairs of splines are sized and configured to be moved into mating position by movement of at least one pair of positioning splines with respect to the other pair of positioning splines in a direction substantially perpendicular to the lengths of the respective positioning splines.

4. A modular structural member capable of supporting a load or loads; comprising:

(a) a plurality of structural module means each of a selected length and peripheral configuration such that a predetermined number of said structural modular means together, when disposed in adjacent side-by-side and coacting disposition, form a peripherally enclosed hollow tubular structural member;

(b) module positioning means disposed between adjacent and coacting structural module means to facilitate said side-by-side coacting disposition thereof; and (c) force applying means disposed for coaction with said module positioning member to maintain adjacent modules positioned for coaction with respect to each other and by doing so to maintain the integrity of the structural member and its capability to support a load or loads at least a portion of which acts on the structural member in a direction perpendicular to said selected length thereof, wherein said module positioning means includes a first positioning member carried by a first structural modular means and a second positioning member carried by second structural modular means, said first positioning member and said second positioning member coacting with each other when said first structural modular means and said second structural modular means are disposed in adjacent coacting positions, wherein said first positioning member and said second positioning member each include at least a pair of positioning splines, said pair of positioning splines of said first positioning member and said pair of positioning splines of said second positioning member being of sizes, dispositions and configurations to coact with and mate with each other, wherein said pairs of positioning splines are sized and configured to coact in only one mating position, wherein said force applying means maintains a bias between said first positioning member and said second positioning member that maintains said pairs of positioning splines in said mating position.

5. A modular structural member capable of supporting a load or loads; comprising:

(a) a plurality of structural module means each of a selected length and peripheral configuration such that a predetermined number of said structural modular means together, when disposed in adjacent side-by-side and coacting disposition, form a peripherally enclosed hollow tubular structural member;

(b) module positioning means disposed between adjacent and coacting structural module means to facilitate said side-by-side coacting disposition thereof; and (c) force applying means disposed for coaction with said module positioning member to maintain adjacent modules positioned for coaction with respect to each other and by doing so to maintain the integrity of the structural member and its capability to support a load or loads at least a portion of which acts on the structural member in a direction perpendicular to said selected length thereof, wherein said module positioning means includes a first positioning member carried by a first structural modular means and a second positioning member carried by second structural modular means, said first positioning member and said second positioning member coacting with each other when said first structural modular means and said second structural modular means are disposed in adjacent coacting positions, wherein said first positioning member and said second positioning member each include a plurality of positioning splines that are of a size, disposition and configuration such that said splines of said first positioning member mate with splines of second positioning member when said module means are disposed in side-by-side coacting positions; said plurality of splines of said first positioning member including top lands and bottom lands with side walls therebetween and said plurality of splines of said second means also including top lands and bottom lands with side walls therebetween, and at least one spline and one bottom land are of a different but coacting size than others of said splines and bottom lands so that mating of said splines can only occur in one relative disposition thereof.

6. A modular structural member capable of supporting a load or loads; comprising:
(a) a plurality of structural module means each of a selected length and peripheral configuration such that a predetermined number of said structural modular means together, when disposed in adjacent side-by-side and coacting disposition, form a peripherally enclosed hollow tubular structural member;
(b) module positioning means disposed between adjacent and coacting structural module means to facilitate said side-by-side coacting disposition thereof; and
(c) force applying means disposed for coaction with said module positioning member to maintain adjacent modules positioned for coaction with respect to each other and by doing so to maintain the integrity of the structural member and its capability to support a load or loads at least a portion of which acts on the structural member in a direction perpendicular to said selected length thereof,
wherein said module positioning means includes a first positioning member carried by a first structural modular means and a second positioning member carried by second structural modular means, said first positioning member and said second positioning member coacting with each other when said first structural modular means and said second structural modular means are disposed in adjacent coacting positions,
wherein said first positioning member and said second positioning member each include a plurality of splines that are of a size, disposition and configuration such that said splines of said first positioning member mate with splines of said second positioning member when said module means are disposed in side-by-side coacting positions; said plurality of splines of said first positioning member including top lands and bottom lands with side walls therebetween and said plurality of splines of said second positioning member also including top lands and bottom lands with side walls therebetween, and at least one spline and one bottom land are of a different but coacting size than others of said splines and bottom lands so that mating of said splines can only occur in one relative disposition thereof,
wherein said size, disposition and configuration of said splines are such that said side walls thereof are disposed at selected angles with respect to said top lands and bottom lands such that said side walls engage prior to said top lands being able to seat against said bottom lands.

7. A modular structural member; comprising:
(a) a plurality of structural module means each of a selected length and peripheral configuration such that a predetermined number of said structured module means together, when disposed in adjacent side-by-side and coacting disposition, form a peripherally enclosed hollow tubular structural member;
(b) module positioning means disposed between adjacent and coating structural module means to facilitate said side-by-side coacting disposition thereof; and
(c) each said module positioning means including a first positioning member carried by a first structural module means and a second positioning member carried by a second structural module means, said first positioning member and said second positioning member coacting with each other when said first structural module means and said second structural module means are disposed in adjacent coacting positions;
(d) said first positioning member and said second positioning member each including at least a pair of positioning splines, said pair of positioning splines of said first positioning member and said pair of positioning splines of said second positioning member being of sizes, dispositions and configurations to coact with and mate with each other in only one mating position;
(e) force applying means disposed for coaction with said module positioning means to maintain adjacent modules positioned for coaction with respect to each other and by doing so to maintain the integrity of the structural member;
(f) said force applying means maintaining a bias between said first positioning member and said second positioning member to maintain said pairs of positioning splines in said mating position thereof;
(g) said force applying means comprising at least one resilient coiled insert disposed in position to urge said first positioning member and said second positioning member into coaction with each other.

8. A modular structural member; comprising:
(a) a plurality of structural module means each of a selected length and peripheral configuration such that a predetermined number of said structured module means together, when disposed in adjacent side-by-side and coacting disposition, form a peripherally enclosed hollow tubular structural member;
(b) module positioning means disposed between adjacent and coating structural module means to facilitate said side-by-side coacting disposition thereof and extending the length of said structural module means;
(c) each said module positioning means for each structural modular means including a first positioning member carried by said structural module means along one side thereof and a second positioning member carried by said structural module means along another side thereof spaced from and parallel with said first side, such that said first positioning member is disposed to coact with a second positioning member of a module means when two module means are disposed in side-by-side coacting positions;
(d) said first positioning member extending along said entire side of said module means and said second positioning member extending along said entire another side of said module means;
(e) force applying means disposed for coaction with said module positioning means to maintain adjacent modules positioned for coaction with respect to each other and by doing so to maintain the integrity of the structural member;
(f) said force applying means including a plurality of resilient coiled inserts disposed along the length of said module positioning means and urging said first positioning member and said second positioning member into said coacting relationship.

9. The modular structural member of claim 8 wherein said first positioning member includes a male member extending along one side of said module means and a female member extending along another side of said module means such that said male member of one module means can be received within said female member of another of said module means when said module means are disposed in side by side adjacent coacting positions.

10. The modular structural member of claim 9 wherein said female member includes a pair of spaced jaws having facing jaw surfaces with said splines disposed on one of said facing jaw surface and said male member includes a first outer surface carrying said splines disposed for coaction with said splines on said facing surface of said female member, said force applying means acting between said surfaces of said male member and said female member to engage said splines.

11. The modular structural member of claim 10 wherein a groove is formed on said male member on a second surface thereof and a groove is formed on said female member on a second one of said surfaced thereof and so as to aalign with said groove on said male member when disposed for coaction with said female member, said resilient coiled inserts being received in said aligned grooves.

12. The modular structural member of claim 8 wherein at least one of said resilient coiled inserts is disposed proximately an end of at least one of said plurality of structural module means and is of a size, configuration and disposition to receive a threaded fastener.

13. A construction comprising:
   (a) a plurality of modular structural members each capable of supporting a load or loads;
   (b) each modular structural member comprising:
      i) a plurality of structural module means each of a selected length and peripheral configuration such that a predetermined number of said structured module means together, when disposed in adjacent side-by-side and coacting disposition, form a peripherally enclosed hollow tubular structural member;
      ii) module positioning means disposed between adjacent and coacting structural module means to facilitate side-by-side coacting disposition thereof; and
      iii) force applying means disposed for coaction with said module positioning means to maintain adjacent modules positioned for coaction with respect to each other and by doing so to maintain the integrity of the structural member and its capability to support a load or loads at least a portion of which acts on the structural member in a direction perpendicular to said selected length thereof; and
   (c) attaching means connecting said modular structural members into a construction of predetermined configuration.

14. The construction of claim 13 wherein said attaching means connects three of said modular structural members together at a single intersection from which said modular structural members extend at angles of ninety degrees to each other.

15. The construction of claim 13 wherein said attaching means connects at least a pair of said modular structural members in spaced and parallel relationship to each other and a third modular structural member spans said pair of spaced modular structural members and is carried by said pair of spaced modular structural members for movement with respect thereto.

* * * * *